United States Patent
Currans et al.

(10) Patent No.: US 7,242,492 B2
(45) Date of Patent: Jul. 10, 2007

(54) PROXIED PRINTING SERVICES

(75) Inventors: Kevin G. Currans, Philomath, OR (US); Jon A. Brewster, Monmouth, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1297 days.

(21) Appl. No.: 10/057,401

(22) Filed: Jan. 25, 2002

(65) Prior Publication Data

US 2003/0142334 A1 Jul. 31, 2003

(51) Int. Cl.
*G06K 15/00* (2006.01)
(52) U.S. Cl. ..................... 358/1.15; 358/468
(58) Field of Classification Search ............... 358/1.9, 358/1.15, 1.168, 1.18, 468, 1.3, 1.16, 404, 358/444
See application file for complete search history.

(56) References Cited

U.S. PATENT DOCUMENTS

| 6,067,406 | A | * | 5/2000 | Van Hoof et al. ........... 358/1.9 |
| 6,378,983 | B1 | * | 4/2002 | Ito et al. ..................... 347/43 |
| 6,757,070 | B1 | * | 6/2004 | Lin et al. ..................... 358/1.1 |
| 7,016,061 | B1 | * | 3/2006 | Hewitt ....................... 358/1.15 |

* cited by examiner

*Primary Examiner*—Jerome Grant

(57) ABSTRACT

Embodiments of the present invention provide methods, an image processing device, a computer network and a simple network printer wherein a simple network printer without RIP capability is enabled to print a print job that includes raster image processor instructions. In one embodiment of the method of the present invention, the steps include receiving and storing, by the simple network printer, a broadcast from a raster image processor (RIP)-enabled unit announcing the RIP-enabled unit's capabilities and, upon receiving a RIP print job request from a source, requesting the RIP-enabled unit to proxy the print job and send the print job in simple format to the simple network printer for printing.

17 Claims, 6 Drawing Sheets

PROXIED PRINTING SERVICES

BACKGROUND OF THE INVENTION

The present invention relates to network printing systems and more particularly, to network printing systems that provide for distributed transfer of data from a high level language into dots or pixels in a printer or imagesetter.

Typically network printing systems include at least one printer, at least one client computer, and at least one server distributed over the network. Networking systems may be of a LAN, WAN, token ring, ethernet, TCP/IP or other type. A client computer prepares data for a document or an image or a combination thereof and transmits the data over the network to a server that is linked to a desired printer. Various printers typically may have different printing capabilities. Where a print job requires specific capabilities, some network printing systems provide centralized and distributed management of the printing system so that the print job is routed to a printer that can handle the job.

A new print job typically has one or more electronically stored files along with print attributes for the files, The print attributes provide processing information for the files, typically in a job ticket or in conjunction with a job ticket.

Early printers received pages of data that were decomposable into a set number of lines, each having a preset number of character spaces. When printing, first the data was encoded using a Page Description Language (PDL), which determined the look of the printed page. Each command of the PDL corresponded to a feature of the printer. Such printers generally were called simple printers since simple PDLs were utilized.

Printers became more sophisticated, thus requiring more complex PDLs for controlling the printing. The increased complexity tended to cause development of printers that were more directly related to specific PDLs in accordance with the desired printing capabilities. Thus, applications then needed to be complex enough to accommodate a variety of printers, each of which had specific PDLs that it accommodated. Concomitant with the increased complexity of the applications, the cost of printers increased.

Before the advent of laser printers, the design of a PDL was straightforward. The hardware of the target printer had a limited number of capabilities, each capability having a command that controlled it. For example, Raster Image Processors (RIPs) were used to produce pixelmaps or bitmaps for higher languages for data written in the Postscript language. However, the hardware of a laser printer places dots onto the paper. In order to communicate the information for placing dots onto a full page at 9600 baud, i.e., about eight million bits, over fifteen minutes would be required. By putting a processor into the laser printer, the processor converted the data in PDL language to the eight million bits needed by the laser printer. However, since laser printers can print any combination of graphics, font styles and sizes, and since PDLs had typically had only limited instructions, new PDLs had to be developed. Some vendors developed common PDLs for particular printers, and some vendors just revised the whole set of PDLs. Programs for directing one printer often did not direct another printer properly. In particular, fonts needed to be designed with a bitmap for each size and orientation of each font. Data had to be converted to dots, typically using a RIP.

Complex languages were developed to allow descriptions of pages in addition to providing control of printers. Print image files such as a Postscript, Tagged Image File Format (TIFF), RIP, Portable Document Format (PDF) or Printer Control Language (PCL) file provided information on the location of the print image file within the network printing system and the location of the source file from which the print image file was generated to permit the user to modify the contents of the print image. The Postscript language is described in Adobe Systems Incorporated, Adobe PostScript Language Reference Manual, Addison-Wesley (2d ed., .COPYRIGHT. 1990). TIFF format is Tagged Image File format that is used for exchanging bitmapped images (generally scans) between applications. RIP format is Raster Image Processor format in which information is rasterized into a series of dots by an imagesetter or the like for transferring an image onto film or paper. PDF format is Portable Document Format that is available from Adobe Systems Incorporated at San Jose, Calif. PCL is a Printer Control Language available from Hewlett-Packard Company of Palo Alto, Calif. A Printer Control Language file typically specifies objects to be displayed and related information. For example, a PostScript object can include a pixel map defining a pattern of pixels to be displayed, the selected font, and/or font size or it can reference an outline curve that defines a shape to be marked in mathematical terms.

However, the use of the complex languages increased the cost of the printers that utilized such languages. Postscript, for example, divides the objects of a page into three categories: graphics, text and images, wherein graphics are represented mathematically as lines, text is represented by characters described as a mathematical outline, and images are represented as bitmaps. There is a need for methods, an image processing device, a computer network and a simple network printer wherein a simple printer is enabled to utilize the capabilities of the high-end printer or imaging system that has greater printing capabilities than the simple printer.

SUMMARY OF THE INVENTION

Methods, an image processing device, a computer network and a simple network printer are provided that may implement the present invention. A simple network printer without RIP capability is enabled to print a print job that includes raster image processor instructions. In one embodiment of the method, the steps include receiving and storing, by the simple network printer, a broadcast from a raster image processor (RIP)-enabled unit announcing the RIP-enabled unit's capabilities and, upon receiving a RIP print job request from a source, requesting the RIP-enabled unit to proxy the print job and send the print job in simple format to the simple network printer for printing.

DETAILED DESCRIPTION OF THE PREFERRED EMBODIMENT

In the embodiments of the invention disclosed herein, a simple network printer executes printing of print jobs having complex print language commands that formerly required a more complex device to interpret the commands. The simple network printer, as defined for the purposes herein, is a printer in a network that is not capable of processing raster image processor commands itself. In the embodiments disclosed herein, the simple network printer acts as a proxy for the print job by using the more expensive device for conversion of the complex print language commands and the image information of the print job to a format such as Printer Control Language (PCL) that the simple network printer can then execute. The more expensive devices that the simple network printer may utilize for this conversion may be, for example, laser printers or printer servers.

Figure 1:
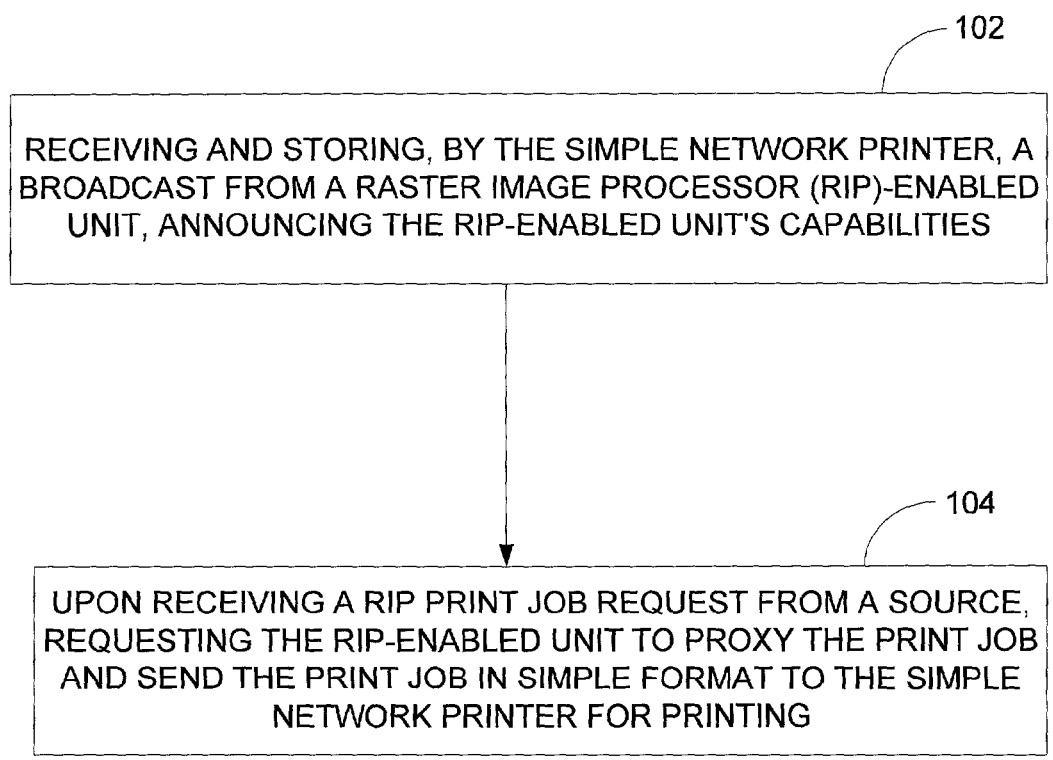
FIG. 1 is a flowchart for one embodiment of steps of a method in accordance with the present invention.

FIG. 1 is a flow chart of one embodiment of a method of the present invention. The method provides for enabling a simple network printer to print a print job that includes raster image processor (RIP) instructions, wherein the simple network printer is defined as a printer in the network that lacks RIP capabilities. Typically, the RIP-enabled unit in the network system broadcasts its capabilities over the network at predefined intervals. The simple network printer, upon receiving the broadcast from a raster image processor (RIP)-enabled unit announcing the RIP-enabled unit's capabilities, stores (102) the information. Thus, upon receiving a RIP print job request from a source, the simple network printer requests the RIP-enabled unit to proxy (104) the print job and send the print job in simple format to the simple network printer for printing. The simple format typically utilizes by the simple network printer is the Printer Control Language (PCL) format.

Interconnection of the various units in the networks described throughout the description of the present invention, or of any other units added to the network, may be either wireless or hardwired connections, as desired.

Figure 2:
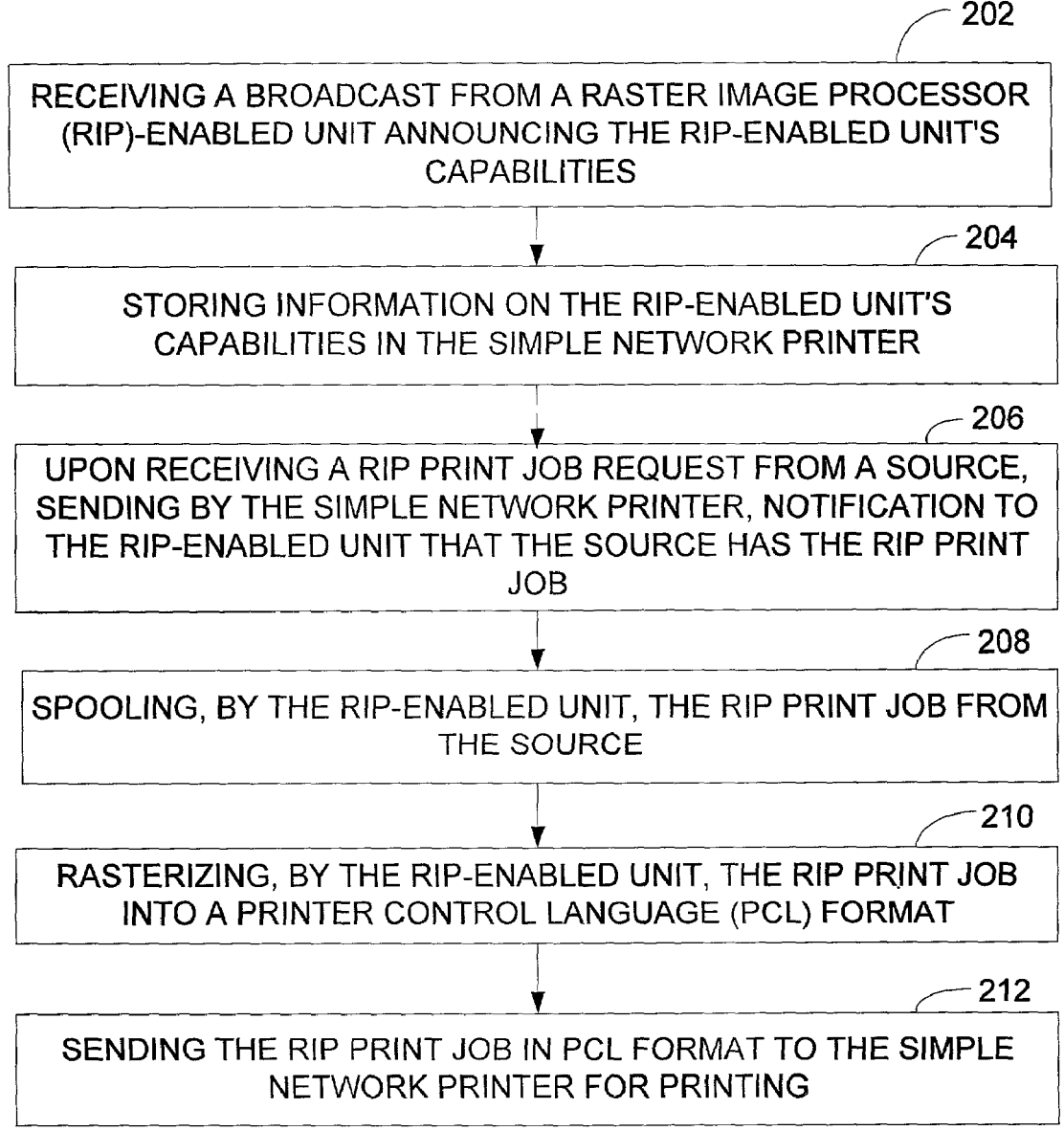
FIG. 2 is a flowchart for another embodiment of steps of a method in accordance with the present invention.

FIG. 2 is a flow chart for another embodiment of steps of a method in accordance with the present invention. A simple network printer, i.e., a non-RIP enabled printer coupled to a network, is enabled to print a print job that includes raster image processor instructions. The method includes the steps of receiving a broadcast (202) from a raster image processor (RIP)-enabled unit, announcing the RIP-enabled unit's capabilities and storing (204) information on the RIP-enabled unit's capabilities in the simple network printer. When a RIP print job request is received from a source, the simple network printer sends (206) notification to the RIP-enabled unit that the source has the RIP print job. A source is typically a computing unit such as a workstation, a computer, a handheld computer, or a digital assistant.

"Spooling" typically means temporarily holding a print job so that the application printing can continue. This may be achieved by copying the entire print job into a file and sending it to the actual output device at a rate the output device can consume it. In operating systems such as LINUX®, WINDOWS®, and the MacOS®, the printing of a document generally occurs on a separate thread (user process) and may be blocked, i.e., temporarily suspended, without impacting the application. In previous implementations, blocking the printing process would also suspend the whole application. In present implementations, when an output device spools the print job, the device typically holds the entire job until printing is completed. However, printjobs may be large files, e.g., 300 MB, and laser printers generally have small storage such as 10 MB.

Methods in accordance with the present invention provide for the producer (print thread of the application) of the job to hold the print job temporarily or suspend the application's print thread when the buffers become full. Thus, the "spooling" device, such as a laser printer, requests a page of the job at a time, for example, (to keep buffers small) from the producer's temporary holding place. Each request the "spooling" device makes of the application's print thread unsuspends the thread, allows the thread to produce the output for the request, and again suspends the thread. Programming in which a request unblocks the thread and allows it to produce more output, followed by suspending the thread is well-known to those skilled in the art and will not be discussed further herein. Since devices such as laser printers, for example, using the present invention may request a particular size of output (such as a page, for example), such "spooling" may appear, to a user, to be similar to older types of "spooling", but instead is a type of "spooling" that facilitates printing without requiring large amounts of disk space for temporary files that include output and directions relating to the output. In some cases, when prior art methods are used, when a large amount of file space is needed and is not available, the printing system may fail. Embodiments of the present invention do not require a large file space to hold a whole print job, but instead feed the print job to the printer at the rate at which the printer can consume it, eliminating the need for a large file space to hold the print job.

The RIP-enabled unit of FIG. 2 spools (208) the RIP print job from the source and rasterizes (210) the RIP print job into a Printer Control Language (PCL) format. Then, the RIP-enabled unit sends the RIP print job in PCL format to the simple network printer for printing. While the RIP-enabled unit is aiding the simple network printer by simplifying the complex printer language commands and image information to a format that the simple network printer can utilize, if the RIP-enabled unit is performing other functions, the total speed of the RIP-enabled unit may be slowed.

Again, the RIP-enabled unit is typically a laser printer having a raster image processor or a print server having a raster image processor.

In one embodiment, the RIP-enabled unit spools each page separately for rasterizing and delivering in PCL format.

The RIP instructions may include instructions using, for example, Postscript®, Tagged Image File Format (TIFF), Portable Document Format (PDF), Personalized Print Markup Language (PPML), or Scalable Vector Graphics (SVG). PPML is a newer XML-based industry standard printer language for variable data printing defined by PODi, an industry-wide consortium of thirteen companies. PPML is an open, interoperable device-independent standard that supports a full range of on-demand printing ranging from the office environment to high-speed production environments, thus enabling widespread use of personalized print applications. SVG is a language for describing two-dimensional vector and mixed vector/raster graphics in XML. SVG graphic types include text, and XSLT can transform XML documents into SVG output. Thus, SVG is a possible replacement for XSL FO. SVG tools are available from IBM, CSIRO, and Adobe.

Figure 3:
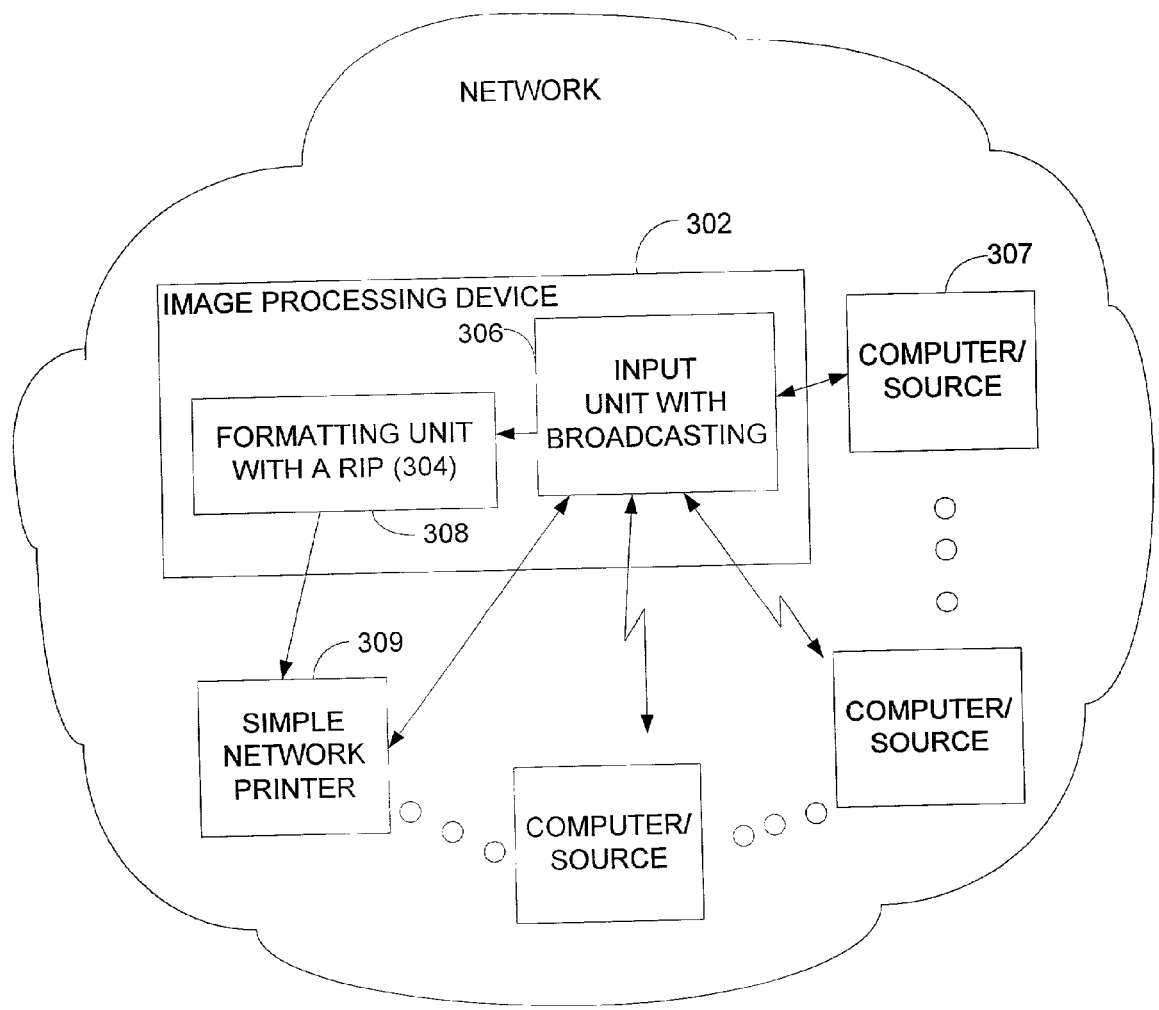
FIG. 3 is a block diagram for one embodiment of an image processing device in accordance with the present invention.

FIG. 3 is a block diagram of an embodiment of an image processing device in accordance with the present invention. In a computer networking environment, the image processing device (302) has a raster image processor (304) and may be utilized by the simple network printer (309) as described above. The image processing device includes an input unit (306) and a formatting unit (308). The input and broadcasting unit (306) inputs image information including print commands in a complex print command language, generally from a computer or other source (307). The formatting unit (308) is coupled to the input unit and includes the raster image processor (304), which, when selected, rasterizes the image information in accordance with the print commands to provide information in a Printer Control Language (PCL) and may send the rasterized image information to a simple network printer (309) to be printed. The image processing device (302) may be, for example, a printer server.

Figure 4:
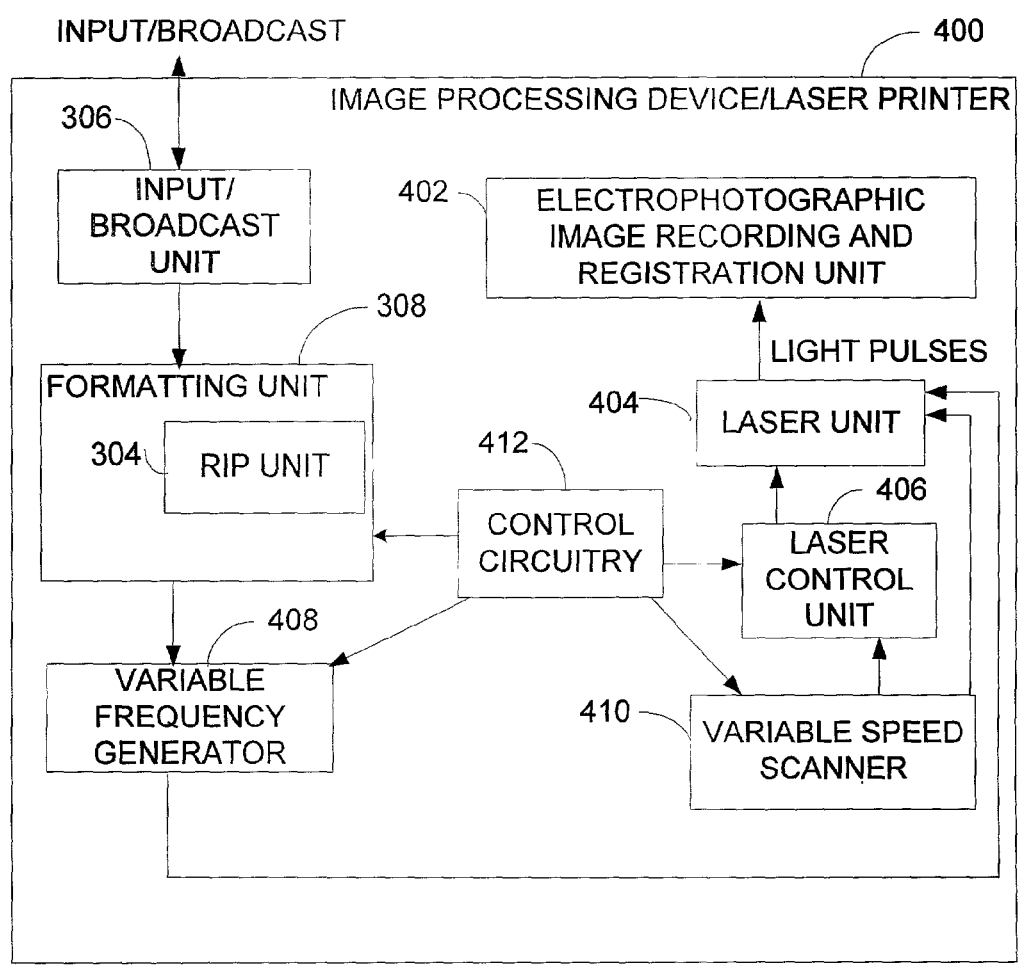
FIG. 4 is a block diagram for one embodiment of a laser printer in accordance with the present invention.

As shown in FIG. 4, where the image processing device (400) is a laser printer, the formatting unit (308) is further utilized for converting the image information and print commands into a data stream for modulating a laser. In addition, in one embodiment the laser printer (400) further includes an electrophotographic image recording and registration unit (402), a laser unit (404), a laser control unit (406) a variable frequency generator (408), a variable speed scanner (410) and control circuitry (412). The electrophotographic image recording and registration unit (402) typically is coupled to the laser control unit (406) and has a photoconducting medium that is used for recording an image generated by light pulses and transferring the image to a printing medium. The laser unit (404) is coupled to the laser control unit and is used for emitting a modulated beam of light pulses in correspondence with data for a desired image. The laser control unit (406) is coupled to the laser unit (404) and the formatting unit (308). The laser control unit (406) modulates the beam of light pulses at variable base frequencies and variable widths of modulating pulses to transmit the data stream from the formatting unit (308). The variable frequency generator (408) is coupled to the formatting unit (308) and the laser control unit (406). The variable frequency generator (408) generates a clock signal for a base frequency for data transfer and laser modulation. The variable speed scanner (410) is coupled to the laser unit (404) and the laser control unit (406) and is used for scanning a modulated laser beam in vertical and horizontal directions across the photoconductive medium. Generally, scanning in the horizontal direction includes using a rotating mirror face (not shown) to direct the modulated laser beam. The control circuitry (412) is coupled to the formatting unit (308), the laser control unit (406), the variable frequency generator (408) and the variable speed scanner (410). The control circuitry (412) is used to operate the laser printer according to a predetermined scheme, wherein print jobs with complex language commands that are proxied to the image processing device (400) are converted to a simple format, such as PCL format, and sent to the respective simple network printer (309) that notified the image processing device (400) of the print job. Numerous examples of general laser printer operation performed by the laser printer are known to those skilled in the art and will not be repeated here.

The image processing device (400) is generally interconnected to at least one of: a workstation, a computer, a handheld computer, or a digital assistant, either wirelessly or via hardwiring. In one embodiment, the image processing device (400) rasterizes the image information by spooling each page separately and delivers the rasterized information to a simple network printer in PCL format for printing. Complex print command language examples are cited above.

Figure 5:
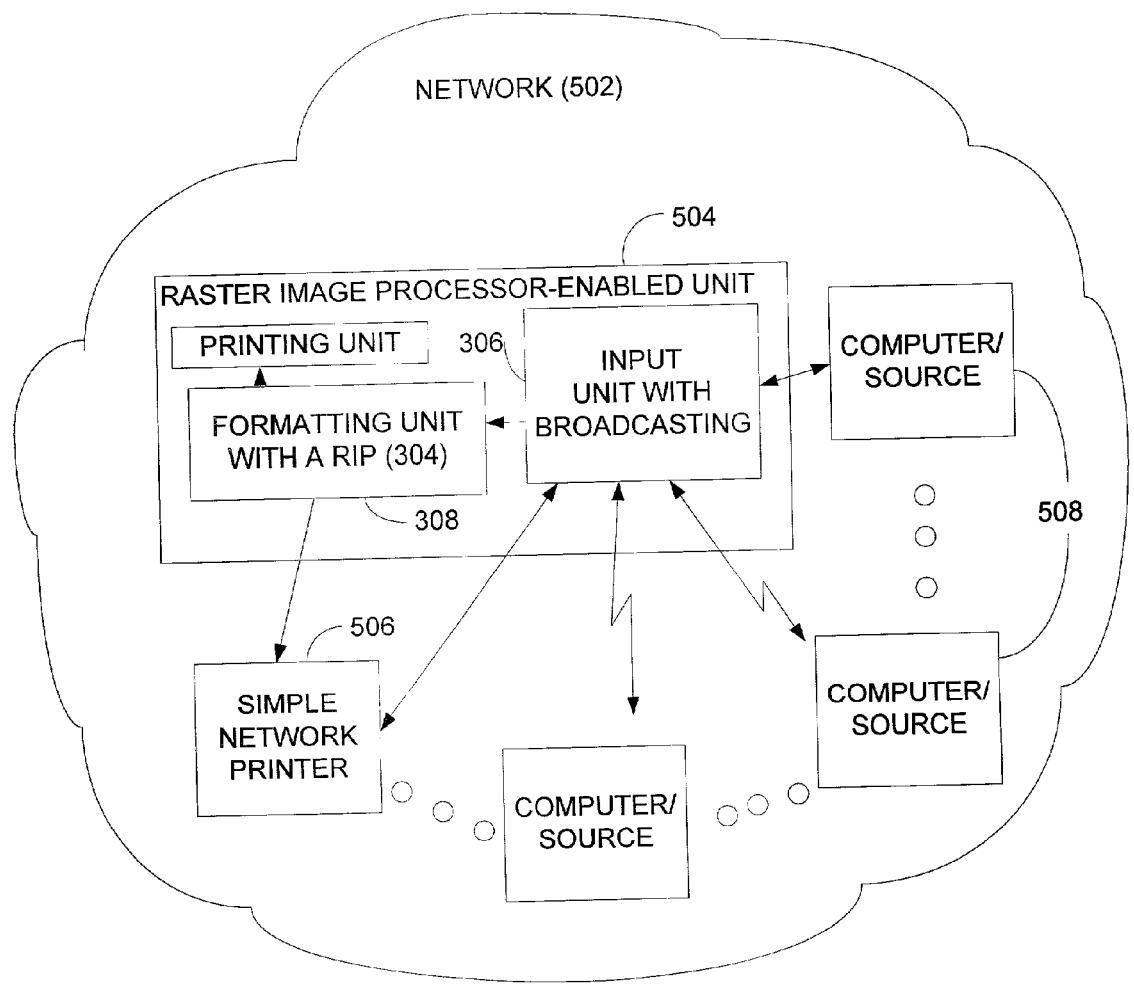
FIG. 5 is a block diagram of one embodiment of a computer network in accordance with the present invention.

FIG. 5 is a block diagram of one embodiment of a computer network in accordance with the present invention. The computer network (502) typically includes a raster image processor-enabled unit (504), at least one simple network printer (506), and a plurality of computing units (508), wherein the foregoing are interconnected in the network (502). Again, interconnection may be wireless or hardwired, as desired. A computing unit may, for example, be a workstation, a computer, a handheld computer, or a digital assistant, The raster image processor-enabled unit (504) is interconnected to the at least one simple network printer (506) and at least one computing unit of the plurality of computing units (508) via the network and is used for facilitating implementation of printing jobs. The at least one simple network printer (506) is interconnected to the raster image processor-enabled unit (504) and to at least one computing unit. As described more fully above, the simple network printer (506) uses the raster image processing capabilities of the raster image processor-enabled unit (504) for printing print jobs that have commands in a complex print command language. The plurality of computing units (508) are interconnected to the raster image processor-enabled unit (504) and to the at least one simple network printer (506). The computing units provide print jobs to at least the one simple network printer (506). Also, the computing units may also provide print jobs to the RIP-enabled unit (504). The computer network (502) may utilize wireless or hardwired connections, as desired.

In one embodiment the raster image processor-enabled unit may be an image processing device (302) having a raster image processor (304), as shown in see FIG. 3, wherein the image processing device (302) includes an input unit (306) and a formatting unit (308), as described more fully above.

Figure 6:
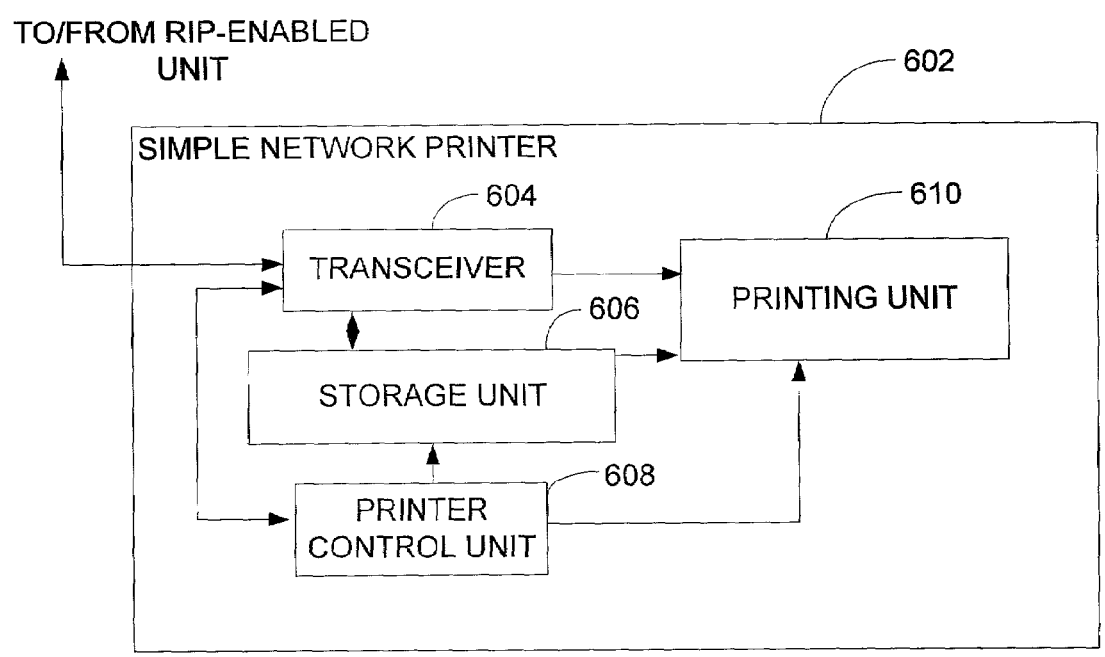
FIG. 6 is a block diagram of one embodiment of a simple network printer in accordance with the present invention.

FIG. 6 is a block diagram of one embodiment of a simple network printer in accordance with the present invention. The simple network printer (602) is arranged to process a print job that includes raster image processor (RIP) instructions via proxying a raster image processor-enabled unit that converts the RIP instructions and image information of the print job to a predetermined Printer Control Language (PCL) format. In one embodiment the simple network printer (602) includes a transceiver (604), a storage unit (606), a printer control unit (608), and a printing unit (610).

The transceiver (604) is intercoupled to the RIP-enabled unit (606) and a plurality of computing units (608) in a network that includes the simple network printer (602). When the simple network receiver's transceiver (502) receives a broadcast from the RIP-enabled unit that announces information on the RIP-enabled unit's capabilities, the transceiver (604) stores the information in the storage unit (606), which is coupled to the transceiver (604) and to the printer control unit (608). When the transceiver (604) receives a RIP print job request from a computing unit, the simple network printer sends notification to the RIP-enabled unit that the simple network printer has received the RIP print job request. Upon the RIP-enabled unit's rasterizing the RIP print job into a Printer Control Language (PCL) format, the transceiver receives the RIP print job in the predetermined PCL format for printing.

The printer control unit (608) is coupled to the transceiver (604), the storage unit (606) and the printing unit (610). The printer control unit (608) controls operation of the simple network printer in accordance with a predetermined scheme, wherein print jobs with complex language commands are proxied to the RIP-enabled unit and the print jobs are printed when the print jobs are received in a simple format such as PCL format. The printing unit (610) is coupled to the printer control unit (608) and the transceiver (604) and is used for printing image information in accordance with the predetermined PCL format. The simple network printer (602) typically receives print jobs from a computing unit in the network such as a workstation, a computer, a handheld computer, or a digital assistant. The RIP-enabled unit is generally a laser printer having a raster image processor or a print server having a raster image processor.

As described above, the RIP-enabled unit may spool each page separately for rasterizing and delivering in the predetermined PCL format. Raster image processor instructions may include, for example, instructions for printing a print image file using Postscript®, Tagged Image File Format (TIFF), Portable Document Format (PDF), Personalized Print Markup Language (PPML), and Scalable Vector Graphics (SVG).

Thus, methods, an image processing device, a computer network and a simple network printer have been described according to the present invention. Many modifications and variations may be made to the techniques and structures described and illustrated herein without departing from the spirit and scope of the invention. Accordingly, it should be understood that the methods, an image processing device, a computer network and a simple network printer described herein are illustrative only and are not limiting upon the scope of the invention.

What is claimed is:

1. A method for enabling a simple network printer to print a print job that includes raster image processor instructions, comprising the steps of:
   receiving a broadcast from a raster image processor (RIP)-enabled unit announcing the RIP-enabled unit's capabilities;
   storing information on the RIP-enabled unit's capabilities in the simple network printer;
   upon receiving a RIP print job request from a source, sending by the simple network printer, notification to the RIP-enabled unit that the source has the RIP print job;
   spooling, by the RIP-enabled unit, the RIP print job from the source;
   rasterizing, by the RIP-enabled unit, the RIP print job into a Printer Control Language (PCL) format; and
   sending the RIP print Job In PCL format to the simple network printer for printing.

2. The method of claim 1 wherein the source is one of a workstation, a computer, a handheld computer, and a digital assistant.

3. The method of claim 1 wherein the simple network printer is in a network having a wireless connection for at least one of: a source, the RIP-enabled unit, and the simple network printer.

4. The method of claim 1 wherein the simple network printer is in a network that is hard-wired.

5. The method of claim 1 wherein the RIP-enabled unit is one of: a laser printer having a raster image processor and a print server having a raster image processor.

6. The method of claim 1 wherein spooling, by the RIP-enabled unit, includes spooling each page separately for rasterizing and delivering in PCL format.

7. The method of claim 1 wherein the print job that includes mater image processor instructions includes instructions for printing a print image file using at least one of: Postscript®, Tagged image FUe Format (TIFF), Portable Document Format (PDF), Personalized Print Markup Language (PPML), and Scalable Vector Graphics (SVG).

8. A simple network printer, arranged to process a print job that includes raster image processor (RIP) instructions via proxying a raster image processor-enabled unit that converts the RIP instructions and image information of the print job to a predetermined Printer Control Language (PCL) format, the simple network printer comprising:
   a transceiver, intercoupled to the RIP-enabled unit and a plurality of computing units in a network that includes the simple network printer, for receiving a broadcast from the RIP-enabled unit, wherein the broadcast announces information on the RIP-enabled unit's capabilities;
   wherein the transceiver, upon receiving a RIP print job request from a computing unit of the plurality of computing units, sends notification to the RIP-enabled unit that the simple network printer has received the RIP print job request and upon rasterizing, by the RIP-enabled unit, the RIP print job into a Printer Control Language (PCL) format, the transceiver receives the RIP print job in the predetermined PCL format for printing;
   a storage unit, coupled to the transceiver and to a printer control unit, for storing information on the RIP-enabled unit's capabilities;
   the printer control unit, coupled to the transceiver, the storage unit and a printing unit, for controlling operation of the simple network printer in accordance with a predetermined scheme; and
   the printing unit, coupled to the printer control unit and the transceiver, for printing image information in accordance with the predetermined PCL format.

9. The simple network printer of claim 8 wherein the computing unit is one of: a workstation, a computer, a handheld computer, and a digital assistant.

10. The simple network printer of claim 8 wherein the RIP-enabled unit is one of: a laser printer having a raster image processor and a print server having a raster image processor.

11. The simple network printer of claim 8 wherein the RIP-enabled unit spools each page separately for rasterizing and delivering in the predetermined PCL format.

12. The simple network printer of claim 8 wherein the print job that includes raster image processor instructions includes instructions for printing a print image file using at least one of: Postscript®, Tagged Image File Format (TIFF), Portable Document Format (PDF), Personalized Print Markup Language (PPML), and Scalable Vector Graphics (SVG).

13. The simple network printer of claim 8 wherein the simple network printer is in a network having a wireless connection for at least one of: the simple network printer, a workstation, a computer, a handheld computer, a digital assistant, and the RIP-enabled unit.

14. The simple network printer of claim 8 wherein the simple network printer is in a network that is hard-wired.

15. A method for enabling a simple network printer to print a print job that includes raster image processor instructions, comprising the steps of:
   receiving and storing, by the simple network printer, a broadcast from a raster image processor (RIP)-enabled unit, announcing the RIP-enabled units capabilities; and
   upon receiving a RIP print Job request from a source, requesting the RIP-enabled unit to proxy the print job and send the print job in simple format to the simple network printer for printing.

16. The method of claim 15 wherein the simple format is Printer Control Language format.

17. The method of claim 15 wherein the RIP-enabled unit is one of: a printer server and a laser printer.

* * * * *

UNITED STATES PATENT AND TRADEMARK OFFICE
CERTIFICATE OF CORRECTION

PATENT NO. : 7,242,492 B2  Page 1 of 1
APPLICATION NO. : 10/057401
DATED : July 10, 2007
INVENTOR(S) : Kevin G. Currans et al.

It is certified that error appears in the above-identified patent and that said Letters Patent is hereby corrected as shown below:

In column 7, line 42, in Claim 1, delete "Job In" and insert -- job in --, therefor.

In column 7, line 44, in Claim 2, after "one of" insert -- : --.

In column 7, line 59, in Claim 7, delete "mater" and insert -- raster --, therefor.

In column 7, line 61, in Claim 7, delete "image FUe" and insert -- Image File --, therefor.

In column 8, line 56, in Claim 15, after "RIP-enabled" delete "units" and insert -- unit's --, therefor.

In column 8, line 58, in Claim 15, delete "print Job" and insert -- print job --, therefor.

Signed and Sealed this

Eleventh Day of August, 2009

David J. Kappos
*Director of the United States Patent and Trademark Office*